United States Patent
Hansen et al.

(10) Patent No.: US 6,961,906 B2
(45) Date of Patent: Nov. 1, 2005

(54) METHOD AND SYSTEM FOR SWITCHING BETWEEN WINDOWS IN A MULTIWINDOW COMPUTER ENVIRONMENT

(75) Inventors: Jill Ann Hansen, Chapel Hill, NC (US); Marco Michael Rengan, Chapel Hill, NC (US); Richard Joseph Zabelicky, Jr., Raleigh, NC (US)

(73) Assignee: Lenovo Pte. Ltd., Singapore (SG)

( * ) Notice: Subject to any disclaimer, the term of this patent is extended or adjusted under 35 U.S.C. 154(b) by 479 days.

(21) Appl. No.: 09/993,754

(22) Filed: Nov. 14, 2001

(65) Prior Publication Data

US 2003/0090521 A1 May 15, 2003

(51) Int. Cl.[7] ................................................ G06F 3/14
(52) U.S. Cl. ...................... 715/767; 715/802; 715/856; 345/157
(58) Field of Search ................................ 715/767, 781, 715/802, 804, 856, 859, 860, 861, 808, 809, 850; 345/157, 161, 163, 856

(56) References Cited

U.S. PATENT DOCUMENTS

| 5,046,001 A | 9/1991 | Barket et al. ............... 364/200 |
| 5,586,243 A | * 12/1996 | Barber et al. ............... 345/856 |
| 5,699,534 A | * 12/1997 | Barber et al. ............... 345/856 |
| 5,777,615 A | * 7/1998 | Barber et al. ............... 715/856 |
| 5,889,517 A | 3/1999 | Ueda et al. ................. 345/339 |
| 5,973,666 A | 10/1999 | Challener et al. ........... 345/146 |
| 6,212,541 B1 | 4/2001 | McAuliffe et al. .......... 709/100 |

FOREIGN PATENT DOCUMENTS

| JP | 4267417 A | 9/1992 |
| JP | 10040002 | 2/1998 |

* cited by examiner

Primary Examiner—Raymond J. Bayerl
(74) Attorney, Agent, or Firm—Sawyer Law Group LLP

(57) ABSTRACT

A method and system for switching between windows running on a multiwindow computer system that retains the user's points of interest is disclosed. The method and system includes allowing a user to register at least one specific point of interest in each of the windows, and displaying a persistent mouse pointer on each of the registered points of interest in the inactive windows. In response to the user making one of the inactive windows active, an active mouse pointer is displayed at the location of the persistent mouse pointer in that window.

9 Claims, 6 Drawing Sheets

METHOD AND SYSTEM FOR SWITCHING BETWEEN WINDOWS IN A MULTIWINDOW COMPUTER ENVIRONMENT

FIELD OF THE INVENTION

The present invention relates to multiwindow computer environments, and more specifically to a method and system for switching between windows in a multiwindow computer environment.

BACKGROUND OF THE INVENTION

Modern operating systems having a graphical user interface, such as Windows™ and Macintosh™, are capable of displaying a re-sizable, movable window for each application executing on a computer. A user interacts with the applications using a keyboard and a pointing device, such as a mouse. Although multiple application windows may be simultaneously displayed, only one application window may be active (in the foreground) at any one time. When tasks in two or more windows are related to each other, the user will take advantage of this multiwindow capability to sequentially work between one or more related applications opened simultaneously in order to multitask. An example of multitasking between related applications is juggling a video editing application in concert with a music editing application and a graphics design application, all being used interactively.

FIG. 1 is a diagram of a conventional computer desktop 10 displaying multiple application windows. Three application windows 12a–c (collectively 12) are shown, each having multiple objects and fields 14a–c (collectively 14) in distinct locations in which the user is required to select or enter application-specific data. A single mouse pointer 16 is displayed that the user may freely move about the desktop 10 and use to select and make active any window 12 of interest. Positioning the mouse pointer 16 over any part of a window 12a and clicking a mouse button (not shown) causes that window 12a, and hence its application, to become active (and highlighted). In response, the other windows 12b and 12c become inactive (grayed out). A second click in the active window 12a is required to select a field 14a or other object inside the window 12a.

In order to work between the application windows 12, the user must move the mouse pointer 16 away from the current field 14a in the active window 12a to another window 12b of interest and then click the mouse to activate the window. The user must then position the mouse pointer 16 and a field 14b of interest within the new active window 12 and click the mouse again. Because the applications typically have very different user interfaces, the fields 14 displayed in each window 12 are not positioned in similar locations. Therefore, the operation requires a high degree of concentration, hand-eye coordination, and tiresome eye-focusing to switch between the fields 14 of the different application windows 12, often impairing the creative process.

What is needed is an improved method and system for switching between windows in a multiwindow computing environment. The present invention addresses such a need.

SUMMARY OF THE INVENTION

The present invention provides a method and system for switching between windows running on a multiwindow computer system that retains the user's points of interest. The method and system includes allowing a user to register at least one specific point of interest in each of the windows, and displaying a persistent mouse pointer on each of the registered points of interest in the inactive windows. In response to the user making one of the inactive windows active, an active mouse pointer is displayed at the location of the persistent mouse pointer in that window.

According to the method and system disclosed herein, while the user is working in an active window, the persistent mouse pointers provide constant feedback of where the user left-off in the inactive windows. And because the active mouse pointer is automatically positioned at the location of one of the persistent mouse pointers when the user switches to a new window, the need for the user to search for and select his or her last position in that window is eliminated.

DETAILED DESCRIPTION

The present invention relates to methods for switching between software application windows in a multiwindow computer environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
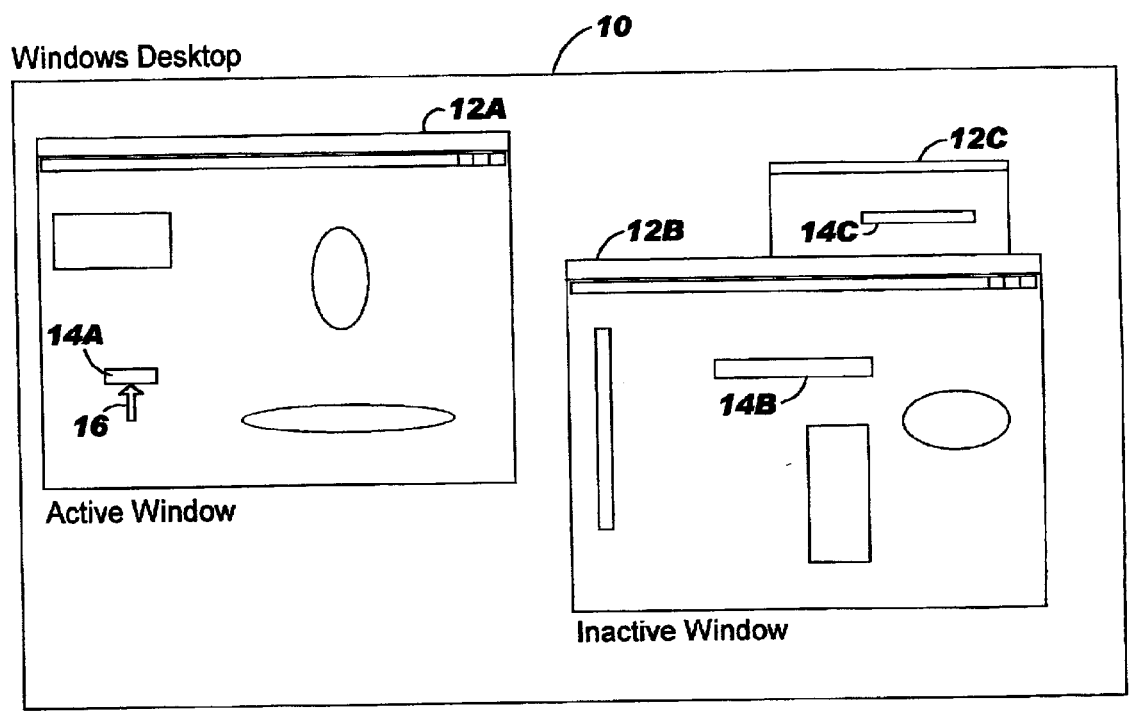
FIG. 1 is a diagram of a conventional computer desktop displaying multiple application windows.
Figure 2:
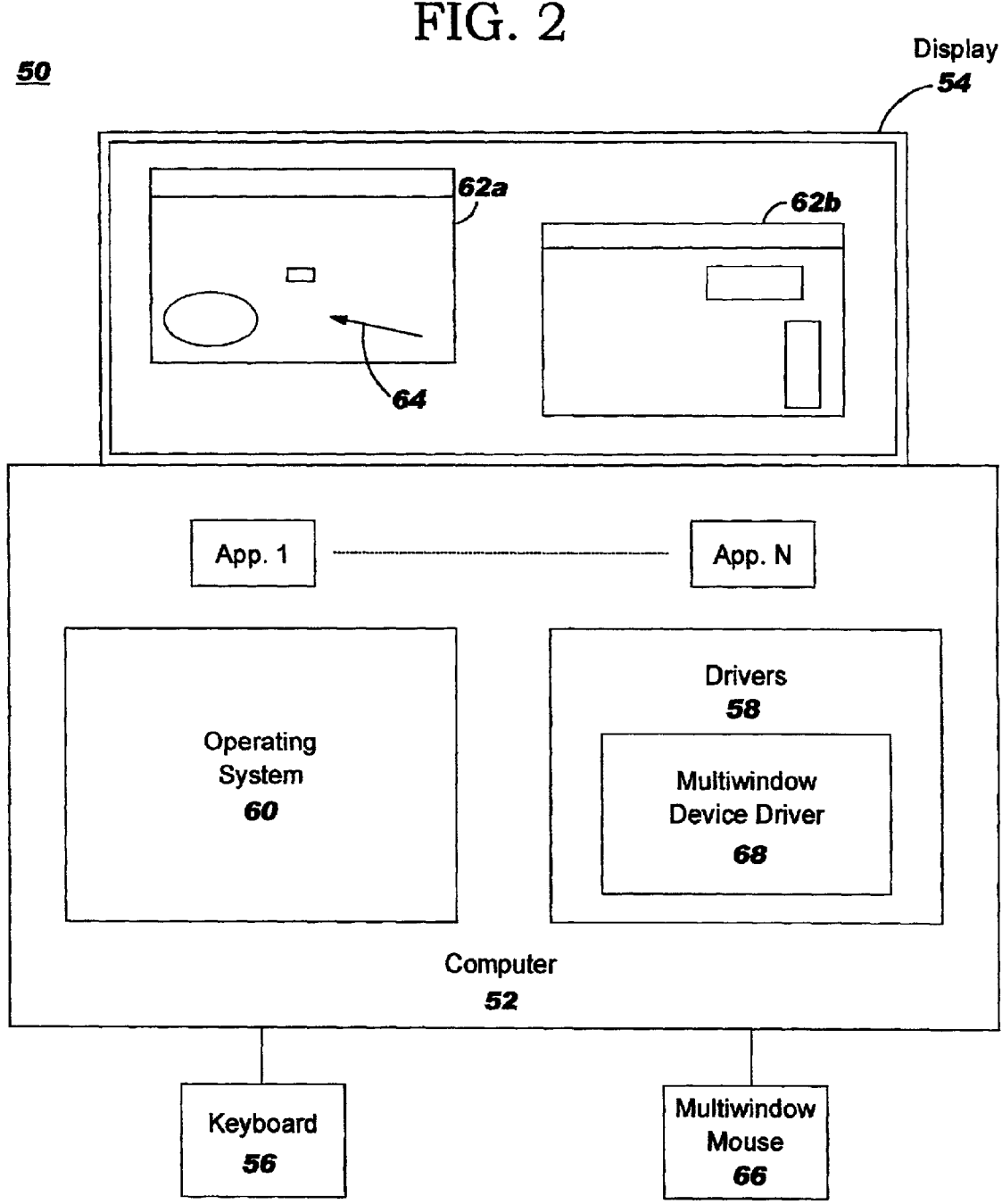
FIG. 2 is a block diagram illustrating a multiwindow computer system for use in accordance with the present invention.

FIG. 2 is a block diagram illustrating a multiwindow computer system for use in accordance with the present invention. The computer system 50 includes a computer 52 such as a PC or workstation, having several peripheral devices including a display screen 54, and a keyboard 56. The peripheral devices require respective device drivers 58 that provide the instructions necessary to activate and control the device.

The computer 52 includes an operating system 60 that is capable of simultaneously executing multiple application programs and displaying corresponding windows 62a and 62b (collectively 62) on the screen. As stated above, when switching between the two windows 62, the user must move a mouse pointer 64 from a specific point of interest in the first window 62a to a specific point of interest in the second window 62b. Because the mouse pointer 64 is moved to the newly activated window 62b, the user's last working position in the first window 62a is lost. Consequently, when the user switches back from the second to the first window 62a, the user must remember and search for the last position to begin working where he or she left off.

To overcome this problem, the present invention provides the computer system 10 with a multiwindow mouse 66 and a multiwindow device driver 68 that retains the user's points of interest when switching between the windows 62.

Figure 3:
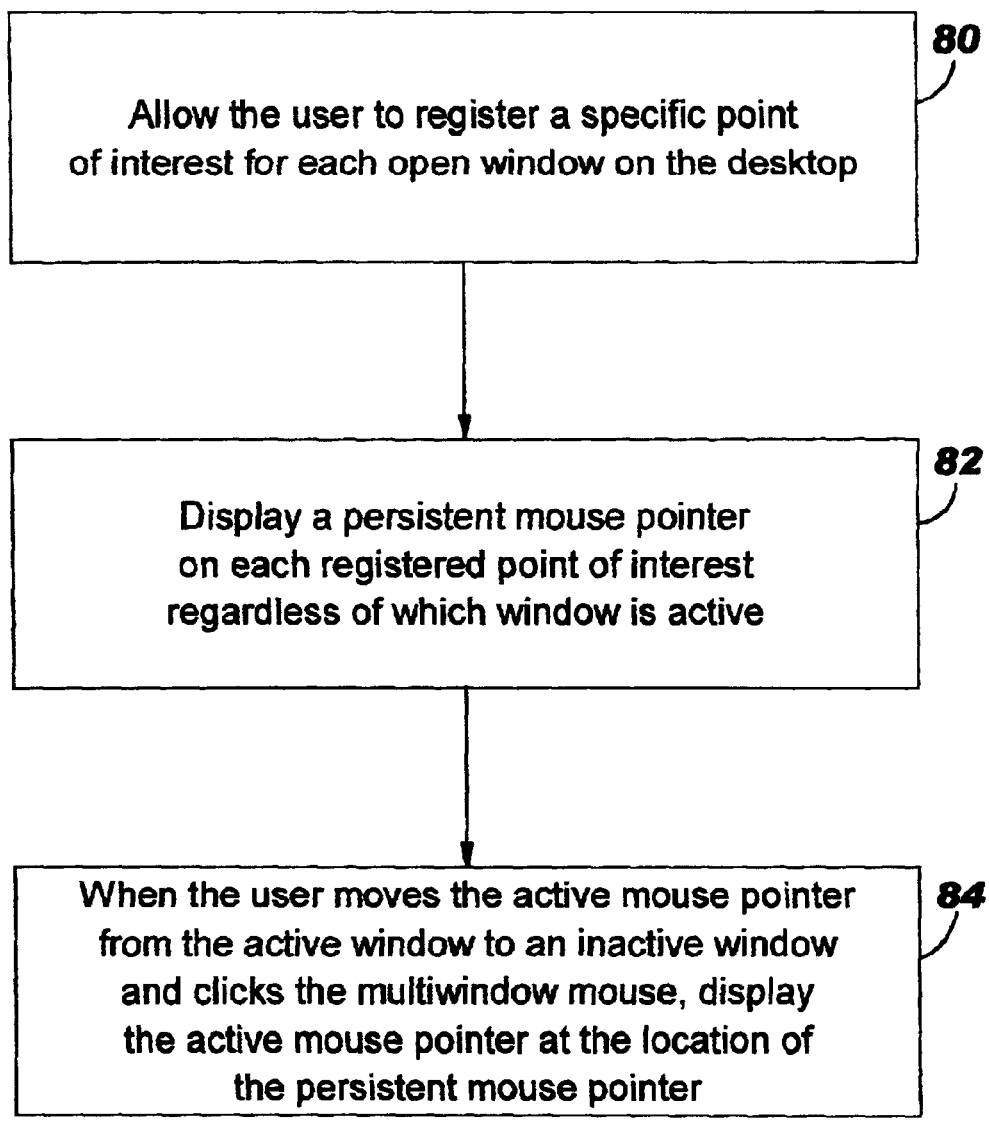
FIG. 3 is a flow chart illustrating a process for retaining points of interest when switching between windows in a preferred embodiment of the present invention.
Figure 4:
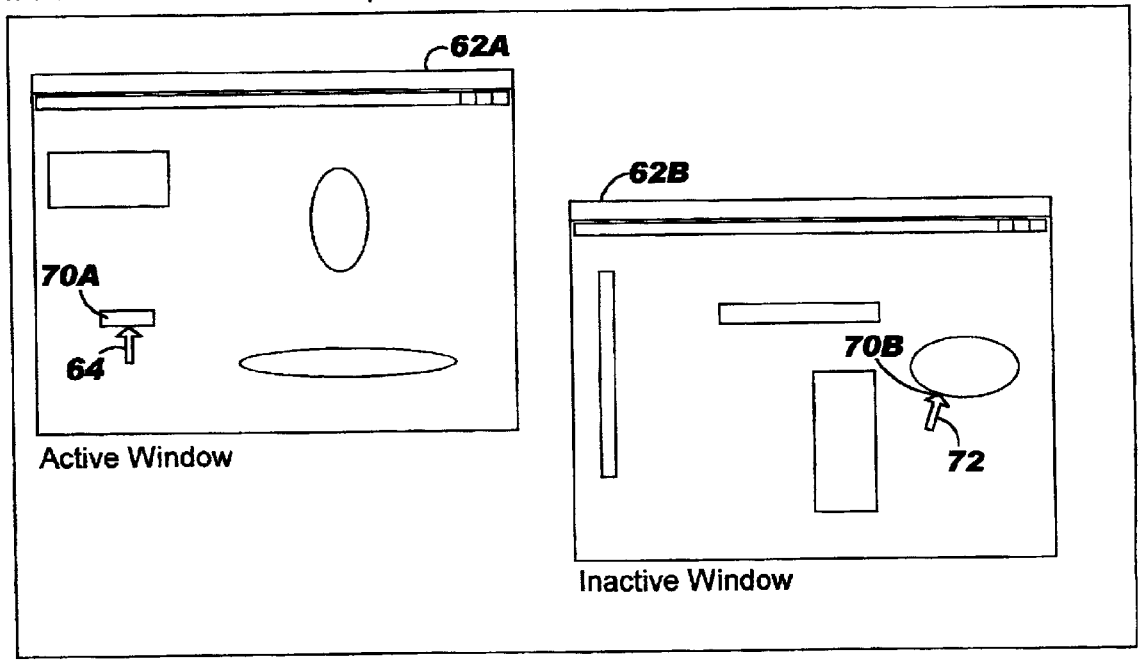
FIG. 4 is a block diagram illustrating the computer system displaying multiple application windows in accordance with the present invention.

FIG. 3 is a flow chart illustrating a process for retaining points of interest when switching between windows in a preferred embodiment of the present invention. According to the present invention, the multiwindow device driver 68 allows the user to register a specific point of interest 70 for each open window 62 on the desktop in step 80. FIG. 4 is a block diagram illustrating the computer system 10 displaying multiple application windows in accordance with the present invention, where like components of FIG. 2 have like reference numerals. Two application windows 62 are shown in which the user has registered a respective point of interest 70a and 70b (collectively 70).

Referring to both FIGS. 3 and 4, in addition displaying an active mouse pointer 64, the multiwindow device driver 68 also displays a persistent mouse pointer 72 on each registered point of interest 70 regardless of which window is active in step 82. When the user moves the active mouse pointer 64 from the active window 62a to the inactive window 62b and clicks the multiwindow mouse 66 in step 84, the active mouse pointer 64 will be displayed at the location of the persistent mouse pointer 72 in that window 62b. While the user is working in the active window 62a, the persistent mouse pointer 72 provides constant feedback of where the user left-off in the inactive window 62b. And because the multiwindow device driver 68 automatically positions the active mouse 64 at the location of the persistent mouse pointer 72 when the user switches windows 62, the need for the user to search for and select such locations is eliminated.

In a preferred embodiment, the user may also register multiple points of interest 70 within a window 62, which is optimized when there is only one open window 62. In this case, the user can move between frequently used points of interest 70 within that window 62 making it easy to access commonly used functions.

Figure 5:
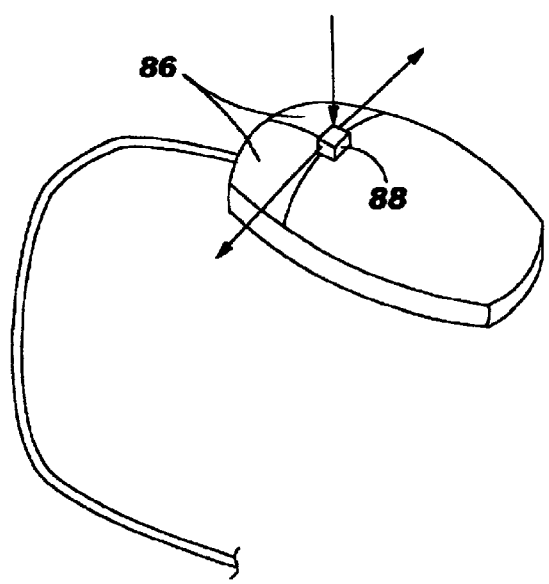
FIG. 5 is a block diagram of the multiwindow mouse in accordance with a preferred embodiment of the present invention.

FIG. 5 is a block diagram of the multiwindow mouse 66 in accordance with a preferred embodiment of the present invention. The multiwindow mouse 66 operates as a conventional mouse and includes standard left and right buttons 86, but is also provided with a joystick 88 that allows the user to switch between the windows 62. In operation, the user presses the joystick 88 to the left or to the right to move between registered points of interest 70 within open windows 62. With each movement of the joystick 88, the multiwindow mouse driver 68 brings the active mouse pointer 64 to the specific location where the user left it before switching windows 62. In an alternative embodiment, the joystick 88 may be replaced by two buttons (not shown); a registration button to register a point of interest 70, and a toggle button to move between the points of interest 70.

Figure 6:
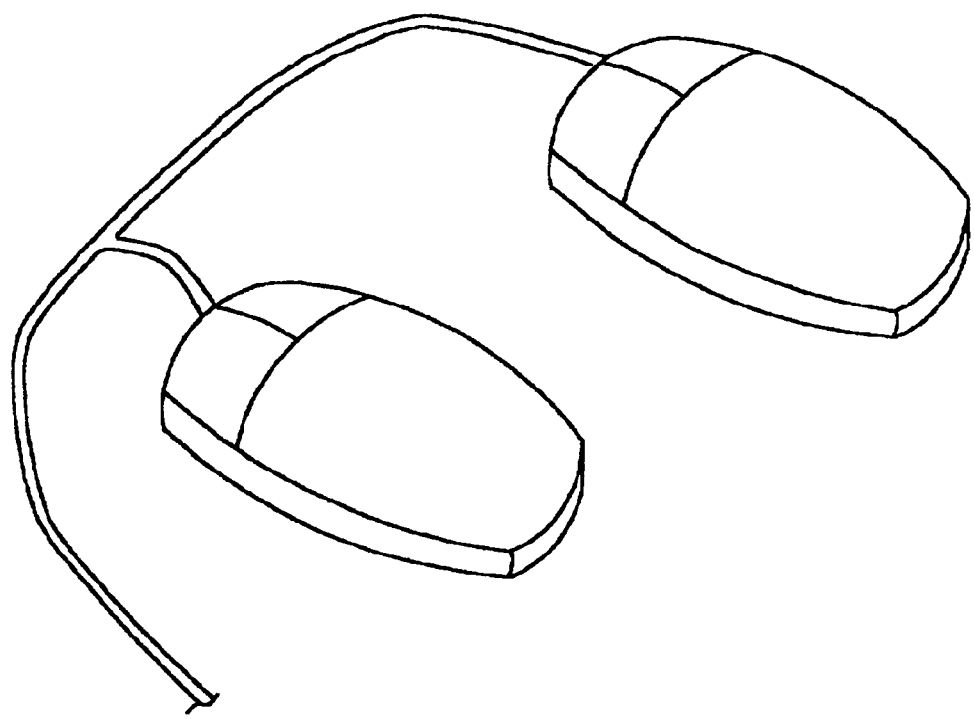
FIG. 6 is a block diagram illustrating a second embodiment of a multiwindow mouse.

FIG. 6 is a block diagram illustrating a second embodiment of a multiwindow mouse. In this embodiment, the multiwindow mouse 90 is implemented as a twin-mouse configuration. Two mice are coupled together and each mouse is dedicated to one open window 62 or a set of open windows 62. The user may use each mouse to switch between multiple points of interest 70 in the corresponding window 62, or the user may use each mouse to switch between points of interest 70 in a corresponding set of windows 62. In an alternative embodiment, the conventional mice in the twin-mouse configuration may be replaced by the multiwindow mouse 66 shown in FIG. 4 to form a twin-headed multiwindow mouse configuration.

In a preferred embodiment, the multiwindow device driver 68 provides the functionality for allowing the user to register points of interest. The driver 68 can be programmed to give the user a choice of registering points of interest 70 by pressing the joystick 88 while performing a right click, or by remapping the right mouse button to set and delete points of interest 70.

Figure 7:
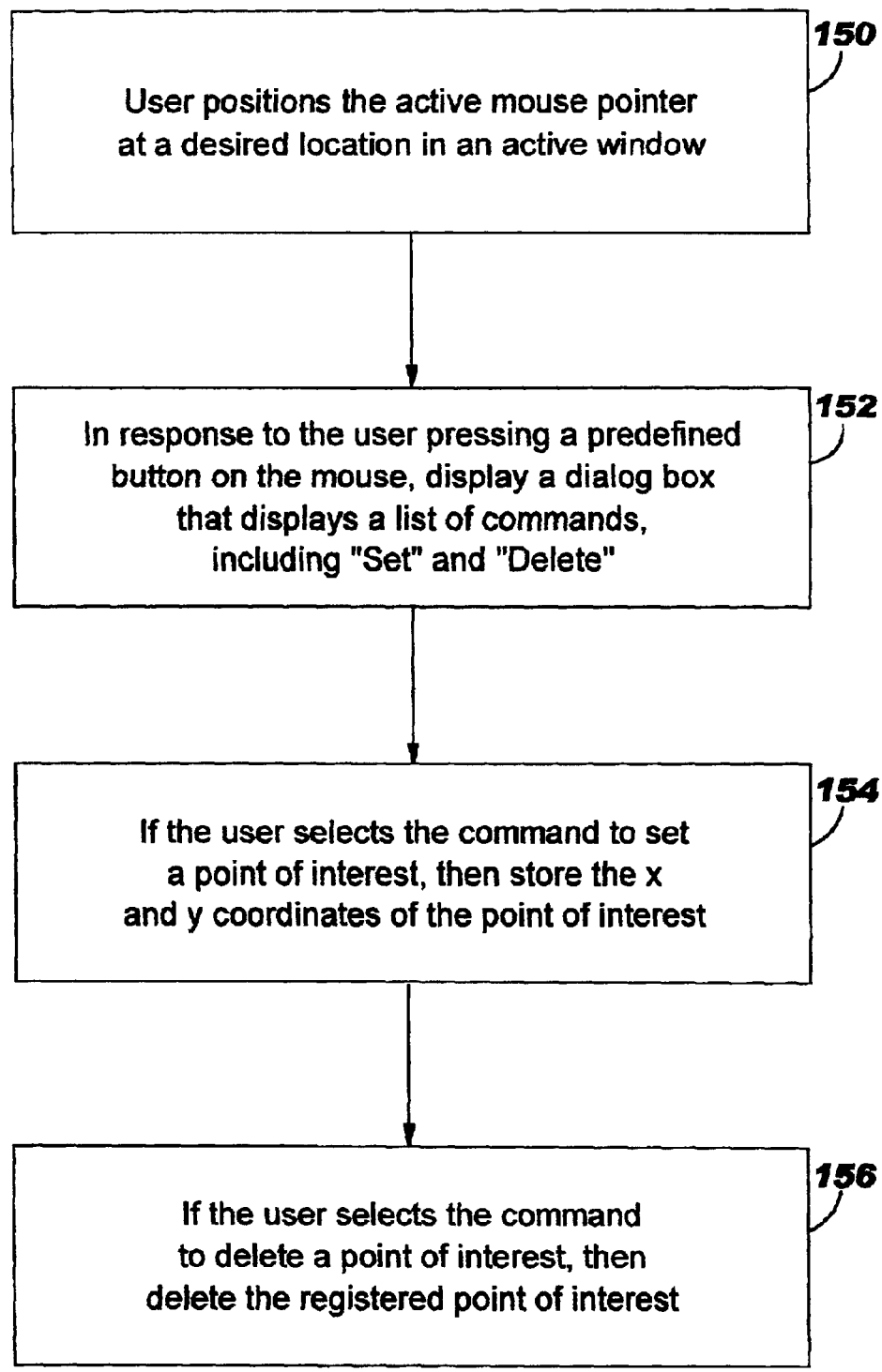
FIG. 7 is a flow chart illustrating the process of registering a point of interest in accordance with a preferred embodiment of the present invention.

FIG. 7 is a flow chart illustrating the process of registering a point of interest in accordance with a preferred embodiment of the present invention. The process begins when the user positions the active mouse pointer 64 at a desired location in an active window 62 in step 150. In response to the user pressing a predefined button on the mouse 66, the multiwindow device driver 68 displays a dialog box that displays a list of commands for user selection in step 152. In a preferred embodiment, the displayed commands include "Set POI" and "Delete POI".

If the user selects the command to set a point of interest 70, then the multiwindow device driver 68 stores the x and y coordinates of the point of interest 70 in step 154. In a preferred embodiment, the multiwindow device driver 68 stores the x and y coordinates, an ID of the active window, and an ID of the next window 62 in a linked list of registered points. For the twin-mouse configuration, an ID of the mouse used to set the point of interest 70 may also be stored. If the user selects the command to delete a point of interest 70, then the registered point of interest 70 is deleted in step 156.

In an alternative preferred embodiment, the multiwindow device driver 68 also enables the user to set and delete points of interest using hotkey sequences on the keyboard.

The method of the present invention may be extended to registering favorite applications and the arrangement of the application windows on the desktop, as well as points of interest 70 within the registered applications. In this embodiment, when the computer is booted, the applications may be automatically opened in the specified window arrangement with the locations of the registered points of interest 70 indicated by the persistent mouse pointers 72.

A method for retaining points of interest when switching between application windows running on a multiwindow computer system has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for retaining points of interest when switching between at least two windows running on a multiwindow computer system, the method comprising:
   (a) allowing a user to register at least one specific point of interest in each of the windows, wherein one of the windows is active and the other windows are inactive, by;
      (i) allowing the user to position the active mouse pointer at a desired location in the active window;

(ii) in response to the user pressing a predefined button on a mouse, displaying a dialog box that displays a list of commands for user selection, which include a set command and a delete command;

(iii) in response to the user selecting the set command, setting the point of interest by storing the x and y coordinates of the point of interest, an ID of the active window, and an ID of a next window;

(b) displaying a persistent mouse pointer on each of the registered points of interest in the inactive windows; and (c) in response to the user making one of the inactive windows active, displaying an active mouse pointer at the location of the persistent mouse pointer in that window.

2. The method of claim 1 further including the step of: allowing the user to register multiple points of interest within at least one of the windows.

3. The method of claim 1 further including the step of: providing a multiwindow device driver for controlling a mouse and for displaying the persistent mouse pointers.

4. A multiwindow computer system capable of displaying multiple windows of open applications on a display screen, wherein one of the windows is active and the other windows are inactive, comprising:

a multiwindow mouse for controlling an active mouse pointer on the display screen, wherein the multiwindow mouse further includes a joystick; and a multiwindow device driver for controlling the multiwindow mouse, the multiwindow device driver including, means for allowing a user to register a point of interest in each of the multiple windows, the means for registering further including, means for allowing the user to position the active mouse pointer at a desired location in the active window, means responsive to the user pressing a predefined button on a mouse for displaying a dialog box that displays a list of commands for user selection, which include a set command and a delete command, and means responsive to the user selecting the set command for setting the point of interest by storing the x and y coordinates of the point of interest, an ID of the active window, and an ID of a next window;

means for displaying a persistent mouse pointer on each of the registered points of interest, and means responsive to the joystick of the multiwindow mouse for allowing the user to switch between the windows and to move between the registered points of interest within the windows, and means responsive to the user making one of the inactive windows active for displaying an active mouse pointer at the location of the persistent mouse pointer in that window.

5. The system of claim 4 wherein the user may register multiple points of interest within at least one of the windows.

6. A multiwindow computer system capable of displaying multiple windows of open applications on a display screen, wherein one of the windows is active and the other windows are inactive, comprising:

a multiwindow mouse for controlling an active mouse pointer on the display screen, wherein the multiwindow mouse further includes a registration button and a toggle button; and a multiwindow device driver for controlling the multiwindow mouse, the multiwindow device driver including, means responsive to the registration button for allowing a user to register a point of interest in each of the multiple windows, means for displaying a persistent mouse pointer on each of the registered points of interest, and means responsive to the toggle button of the multiwindow mouse for allowing the user to move between the registered points of interest within the windows, and means responsive to the user making one of the inactive windows active for displaying an active mouse pointer at the location of the persistent mouse pointer in that window.

7. A computer-readable medium containing program instructions for retaining points of interest when switching between at least two windows running on a multiwindow computer system, the instructions for:

(a) allowing a user to register at least one specific point of interest in each of the windows, wherein one of the windows is active and the other windows are inactive, by;

(i) allowing the user to position the active mouse pointer at a desired location in the active window;

(ii) in response to the user pressing a predefined button on a mouse, displaying a dialog box that displays a list of commands for user selection, which include a set command and a delete command;

(iii) in response to the user selecting the set command, setting the point of interest by storing the x and y coordinates of the point of interest, an ID of the active window, and an ID of a next window;

(b) displaying a persistent mouse pointer on each of the registered points of interest in the inactive windows; and (c) in response to the user making one of the inactive windows active, displaying an active mouse pointer at the location of the persistent mouse pointer in that window.

8. The computer-readable medium of claim 7 further including the instruction of: allowing the user to register multiple points of interest within at least one of the windows.

9. The computer-readable medium of claim 7 wherein the program instructions comprise a multiwindow device driver for controlling a mouse and for displaying the persistent mouse pointers.

* * * * *